May 4, 1965   H. T. TROEGER   3,181,918
FLEXURAL PIVOT
Filed June 29, 1962

INVENTOR.
HENRY TROEGER
BY
Robert W. Ely
ATTORNEY

United States Patent Office 3,181,918
Patented May 4, 1965

3,181,918
FLEXURAL PIVOT
Henry Troeger, Cooperstown, N.Y., assignor to The Bendix Corporation, Utica, N.Y., a corporation of Delaware
Filed June 29, 1962, Ser. No. 206,462
6 Claims. (Cl. 308—2)

This invention relates to devices for supporting a mechanism which is to be limitedly rotated about an axis and more particularly concerns improvements in flexural pivot devices which provide limited relative rotation between two parts by flexing crossed flat springs connecting the two parts.

An object of the present invention is to provide an improved flexural pivot device which is simply constructed and can be made in small sizes and which retains the advantages of no backlash and no friction or wear with resulting limitations due to lubrication at high temperature.

A further object is the provision of an improved flexural pivot device which has axially-aligned tubular members connected by structure including crossed flat springs whereby the device can be simply mounted in support structure and can provide a friction-free, sensitive pivotal mounting suitable for high temperature applications.

Another object is to provide an improved flexural pivot having at least two pairs of crossed springs so connected as to give an increased angular motion without an objectionable shift in the pivot center which has been encountered in some prior constructions of flexural pivots. Such prior pivots permit only relatively small angular motions (thirty degrees being about the largest feasible angle) because, at this spring deflection, the shift in pivot center or axis reaches its tolerable limit.

Figure 1:
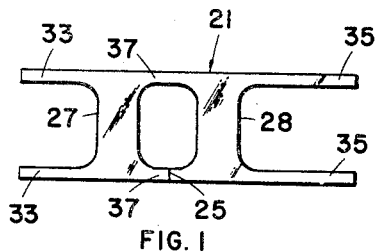
Figure 5:
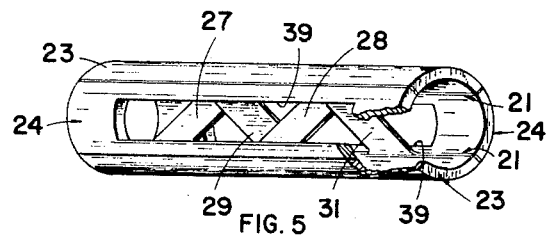
Figure 2:
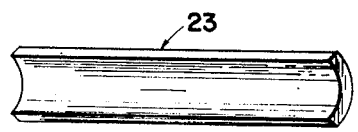
Figure 6:
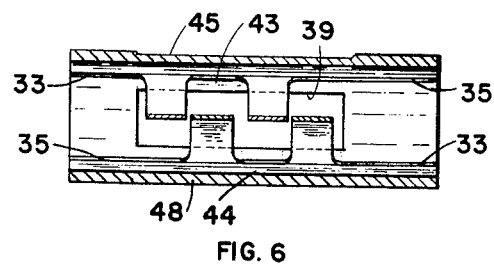
Figure 3:
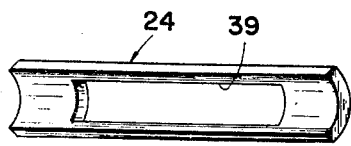
Figure 7:
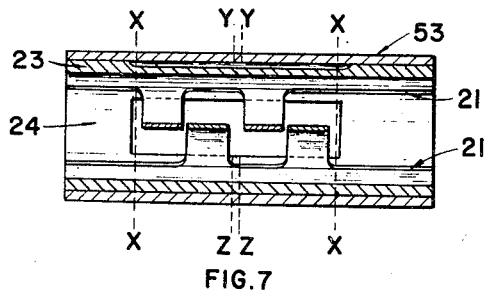
Figure 4:
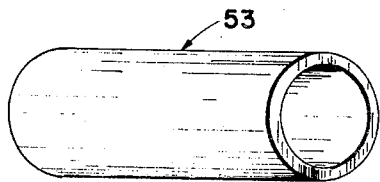
Figure 9:
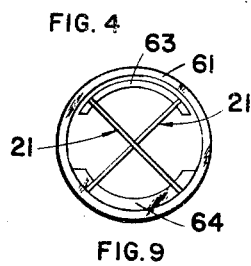
Figure 8:
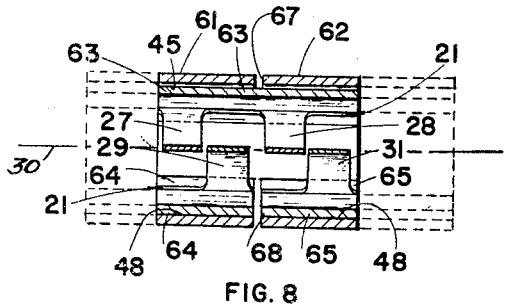

The realization of the above objects along with the features and advantages of the invention will be apparent from the following description and the accompanying drawing in which:

FIGURE 1 is a side view of an off-set, square-D-shaped flat spring element,

FIGURE 2 is a perspective side view of a quadrant without an axial-extending opening, FIGURE 3 is a perspective side view of a quadrant having a large axially-extending opening, FIGURE 4 is a side perspective view of an outer tubular sleeve, FIGURE 5 is a side perspective view (partially broken away) of a tubular assembly comprised of four quadrants and two crossed spring elements received between the axial edges of the quadrants which assembly is ready for a bonding operation, FIGURE 6 is a cross-sectional side view of the bonded tubular assembly of FIGURE 5 after reducing the outer diameter at the top between the slots, FIGURE 7 is a side cross-sectional view of a tubular arrangement comprised of the inner tubular assembly of FIGURE 6 and the outer encasing sleeve of FIGURE 4, FIGURE 8 is a side cross-sectional view of the cantilever-type flexural pivot after the ends have been removed from the FIGURE 7 arrangement and a center cut has been made whereby one end can be rotated relative to the other end, FIGURE 9 is an end view of the severed and cut arrangement of FIGURE 7.

Referring to FIGURES 1–3 and 5, it can be realized that two flat spring elements 21 and two sleeve quadrants 23 and two slotted quadrants 24 are assembled as in FIGURE 5 to provide a tubular assembly. One spring 21 is slipped through the insertion opening 25 in the other square-D-shaped spring 21 and the cross elements 27 and 28 are arranged perpendicular to cross elements 29 and 31 of the square-D-shaped spring 21 to provide two pairs of crossed flat springs. Springs 21 have at each end of its cross elements projections or fingers 33 and 35 extending perpendicularly thereto. Parts 37 between each end of cross elements 29 and 31 can also be referred to as projections. It is to be noted that the cross elements merge on a radius to the various projections whereby the crossed spring elements are better supported and more durable under flexing when brazed to the quadrants and other structure as will be described. The various projections, of course, have the same thickness as the cross members since the springs are made from metal sheet.

Quadrants 23 are solid white quadrants 24 have axially-extending openings 39 which extend lengthwise to adjacent the ends of the quadrants 24 and are opposed in the assembly. These openings 39 become slots which permit limited pivoting or relative rotation, with flexing of the flat crossed springs as will appear, after the further fabrication including bonding as by brazing using flash electroplated depositions or other means.

As seen in FIGURE 5, the tubular assembly is arranged with the elongated quadrants 23 and 24 on a common circle and the ends and projections of the flat springs 21 and 22 positioned between the axial edges of the quadrants. Four fixture elements having curved surfaces for abutting the end edge of the springs and at each side adjacent surfaces of the various quadrants can be used to hold the arrangement together. In place of fixtures, a coiled wire can be used. Both fixture devices would be coated with a "stop-off" agent to prevent adherence to the quadrants or spring edges. The edges of the spring elements and adjacent quadrant parts also can be tack welded to provide the assembly.

In FIGURE 6, the bonded tubular assembly is shown. This assembly has semi-circular rib parts 43 and 44 between the axial openings 39 and the two flat crossed spring elements 21 and 22 extend radially between these ribs 43 and 44. It is to be noted that the ends of openings 39 are slightly outward of the radius part of the cross-elements of springs 21. The upper rib part 43 is formed or machined by grinding so that it has a reduced-diameter, outer surface 45. This surface overhangs each end of slots 39 for a purpose that will be explained. The remaining surface 48 of the rib part 44 has the original diameter of the quadrant circle and serves as a mounting surface.

To obtain the tubular assembly of FIGURE 6 the spring elements 21 or at least the ends of the cross elements 27 and 28 and projections 33, 35, and 37 thereof are thinly coated with a suitable bonding material or agent. Quadrants 23 and 24 are similarly coated, at least the axial edge portions thereof. As mentioned, electroplating can be used for coating. In some cases, a braze or solder material can be used and applied by brush coating. The bonding material will, of course, vary with the material from which the quadrants 23 and 24, and spring elements 21 are made. For example, with brass or bronze quadrants a suitable low-melting solder is applied as a thin coating. With steel quadrants, suitable lower-melting metals are thinly electroplated on the contact or bonding surfaces or these surfaces are thinly-coated with a suitable brazing material. The bonding in some cases can also be effected by using epoxy resin cement. Depending on the temperature at which bonding is effected, certain steel springs or quadrants are heat treated as required during and after bonding. Since the flexural pivot device of the present invention can be made in sizes from about one-eighth of an inch in diameter for instruments to many inches in diameter for flight control surface elements, it is apparent that the size, the loading, the temperature conditions and other factors will govern the selection of the bonding agent and the material for the quadrants or springs.

After forming the tubular structure or assembly, the mounting surface 48 at least is coated. The inner surface of a tubular sleeve 53 (FIGURE 4) is also coated and the sleeve 53 is forced over or encases the tubular assembly to give the tubular arrangement shown by FIGURE 7. After bonding and heat treating for spring characteristics and/or hardness, it is apparent that the inner tubular assembly will be connected at mounting surface 48 to the outer sleeve 53. Next, the ends of the tubular arrangement are cut-off at a plane inwardly of the ends of openings 39 at lines X—X to give inner quarter-circular formations. A center cut is then made through sleeve 53 at lines Y—Y at the center of reduced-diameter surface 45 which is radially-spaced from the inner surface of sleeve 53. Another cut is made at lines Z—Z at the bottom through sleeve 53 and rib 44.

In FIGURES 8 and 9, the completed cantilever flexural pivot is shown and it can be seen that, after the above-described manufacturing steps, there are two outer sleeve means or tubular members 61 and 62 and three arcuate quarter-circular inner elements 63, 64, and 65. The axially-aligned outer members 61 and 62 are axially-spaced and separated at the peripheral opening 67 and the full-cut opening 68 formed by the midpoint cutting operation while the inner arcuate elements or quarter-circular means 64 and 65 result from the cutting therethrough at midpoint and at both ends through axial openings 39. Floating member 63 results from the end cutting and the reduced-diameter surface 45 (FIGURE 6). The left tubular member 61 is bonded to mounting surface 48 of the left arcuate element 64. The right tubular member 62 is likewise bonded to the mounting surface 48 of the right arcuate element 65. The effective angle or travel gap included between the respective adjacent edges of the arcuate elements 63, 65, and 64 is sixty degrees and this angle can have a range of fifteen to eighty-five degrees. The adjacent axially-extending edges or sides of elements 63, 64, and 65 provide a form of stop means or structure to limit safely the flexing of the springs and to limit the relative rotation of members 61 and 62.

It is to be noted that arcuate elements 64 and 65 have spaced facing ends at cut 68 and are respectively bonded to the left and right tubular members 61 and 62 while arcuate member 63 has its curved surface radially spaced from members 61 and 62. Springs 21 and 22 are firmly bonded between the edges of the quadrant rib parts so that attachment is maintained under adverse flexing conditions and further so that relative axial movement or tilting between the left and right tubular members 61 and 62 is prevented. The pairs of crossed springs 27, 29 and 28, 31 provide a rotational axis adjacent to the projected line 30 intersecting the springs and project from the inner or top surfaces of the arcuate elements 64 and 65 to floating element 63.

The operation of the FIGURES 8 and 9 flexural pivot device as a pivot mounting is believed to be apparent from the foregoing description. Thus, with reference to FIGURE 8, an instrument indicator, a butterfly valve, a turbine engine control vane, one end of flight vehicle control surface or many other devices which are usually mounted in bearings and have limited rotation or pivoting is mounted on the left tubular member 61 and the right tubular member 62 is mounted in a hole in support structure and fixed by a set pin or other conventional arrangement. When the instrument indicator, for example, is actuated in a clockwise direction, the left tubular member 61 is rotated clockwise from normal position with the flexing of the springs 27, 28, 29 and 31 as is well known in flexural pivot devices. The radial-spacing between the axially-extending arcuate connecting member 63 and the facing tubular members 61 and 62 provides clearance upon the flexing or bending of the springs. Rotation can be made in either direction as limited by the abutment of the axially-extending edges of the arcuate elements 64 and 65 and floating member 63.

It is to be noted that the present easily-replaceable flexural pivot is made from a relatively few parts (which are connected by two simple bonding steps) and is more compact for a given capacity than constructions which have springs connected by screws to nontubular mounting means. Further, stop or limit means are provided in the compact unitized construction of the present invention which permits also economical use in small-size applications.

It is to be realized that, when sleeve 62 is mounted in support in some conventional manner and the other sleeve 61 has torque applied thereto, sleeve 61 will turn because of the flexibility of flexures or springs 27 and 29. Flexures 27 and 29 will apply this same torque to connecting members 63 which will also turn because of the flexibility of flexures 28 and 31. With all flexures having equal flexibility, the angle of rotation of sleeve 62 is divided equally in deflections of flexure pair 27 and 29 and flexure pair 28 and 31. The connecting member 63 rotates through one half of the angular distance which sleeve 61 travels. In this manner, the angular travel of sleeve 61 is double that which would be permissible for only one effective pair of flexures as with prior constructions in which arcuate structures 64 and 65 are connected diagonally oppositely to sleeves 61 and 62 and have reed-like fingers projecting axially into but radially-spaced from sleeves 61 and 62. With this prior construction, as mentioned, only smaller maximum angular motions (about thirty degrees) are permissible in many instances since spring deflection gives an objectionable shift in pivot center.

It is to be understood that changes can be made in the disclosed embodiments and methods by persons skilled in the art without departing from the invention as set forth in the appended claims.

What is claimed is:

1. A flexural pivot comprised of:
an elongated floating member having first ends of a first crossed flat spring means attached thereto and first ends of a second crossed flat spring means attached thereto and spaced longitudinally from said first crossed spring means,
mounting means for a limitedly-rotatable device connected to the other ends of said first crossed spring means,
support means for attachment to a fixed support device connected to the other ends of said second crossed spring means and being free of any connection to said mounting means except for said spring means and said floating member,
said crossed spring means providing for said mounting means an axis of rotation along the projected line intersecting said crossed spring means,
said floating member having structure spaced from said mounting means and support means to provide respectively a first travel gap and a second travel gap,
said travel gaps providing an angular clearance for said mounting means, whereby said mounting means can be rotated about said axis.

2. A flexural pivot comprised of:
an elongated floating member having first ends of a first pair of crossed flat springs attached thereto and a second pair of crossed flat springs having first ends attached thereto and spaced longitudinally from and in the same planes as said first pair,
mounting means for a limitedly-rotatable device connected to the other ends of said first pair of said springs,
support means for attachment to a fixed support device connected to the other ends of said second pair of said springs and being free of any connection to said mounting means except for said springs and said floating member, said springs providing an axis of rotation along the projected line intersecting said crossed springs, said floating member having stop structure spaced from and arranged to contact said mounting means and support means to provide respectively a first travel gap and a second travel gap, said travel gaps providing an angular clearance for said mounting means, whereby said mounting means can be rotated through said angular clearance about said axis until both of said travel gaps are closed by abutment between said floating member stop structure and said mounting means and said support means.

3. A flexural pivot comprised of:

an elongated arcuate, quarter-circle floating member having first ends of a first pair of crossed flat springs attached thereto and a second pair of crossed flat springs having first ends attached thereto and spaced longitudinally from and in the same planes as said first pair, mounting means for a limitedly-rotatable device connected to the other ends of said first pair of said springs, support means for attachment to a fixed support device connected to the other ends of said second pair of said springs and being free of any connection to said mounting means except for said springs and said floating member, said springs providing an axis of rotation along the projected line intersecting said crossed springs, said floating member having stop structure spaced from and arranged to contact said mounting means and support means to provide a travel gap, said travel gap providing an angular clearance for said mounting means, whereby said mounting means can be rotated through said angular clearance about said axis until said travel gap is closed by abutment between said floating member stop structure and said mounting means and said support means with said floating member moving half the angular clearance.

4. A flexural pivot for relatively large angular travel comprised of:

a mounting element for attachment to a fixed support, a rotatable element for carrying limitedly-rotatable means axially-aligned with said mounting element, at least one pair of flat crossed springs attached to and extending from said mounting element, at least one pair of flat crossed-springs attached to and extending from said rotatable element, said springs having axis of rotation at the projection line intersecting said springs, a floating member connected to the ends of said crossed springs, said floating member being spaced from said elements to provide a circumferential travel gap, whereby said rotatable element can be rotated essentially on said spring axis into said travel gap and said floating member will rotate less than said rotatable element.

5. A flexural pivot for relatively large angular travel comprised of:

an elongated mounting element for attachment to a fixed support having an inner surface, a stop side and an end, an elongated rotatable element for carrying limitedly-rotatable means and having an inner surface, a stop side and an end axially-aligned with said mounting element so that said ends are in spaced facing relation and said inner surfaces and said stop sides face the same direction, at least one pair of flat crossed springs attached to and extending from the inner surface of said mounting element, at least one pair of flat crossed-springs attached to and extending from the inner surface of said rotatable element, said springs being of equal flexibility and having axis of rotation at the projection line intersecting said springs, a floating member connected to the ends of said crossed springs and having a longitudinal side facing toward said stop contact sides of said elements, said longitudinal side of said floating member being spaced the same distance from each of said stop contact sides of said elements to provide a travel gap, said travel gap being in the range of fifteen to eighty-five degrees, whereby said rotatable element can be rotated essentially on said spring axis for said travel gap and said floating member will rotate through half the angular travel of said rotatable element.

6. A flexural pivot for large angular travel comprised of:

a first circular sleeve having an inner surface, a second circular sleeve having an inner surface, said sleeves having the same inner diameter and being axially-aligned with a circumferential clearance gap at adjacent ends, a first arcuate structure projecting radially inwardly from said first sleeve inner surface, a second arcuate structure projecting radially inwardly from said second sleeve inner surface, said first and second arcuate structures being axially aligned and each having the same included angle, two pairs of perpendicularly-crossed flat springs having ends bonded to each of said arcuate structures and extending radially toward opposed inner surfaces of said sleeves, an arcuate thin-walled connecting member bonded to the other ends of said pairs of springs, said connecting member having a curved outer surface radially spaced from the inner surfaces of said first and second sleeves, said arcuate structures and said arcuate connecting member having the same inner diameter, said connecting member having axially-extending edges which are equally spaced from the axially-extending stop edges of said arcuate structures to provide travel gaps of fifteen to eight-five degrees, said flat springs having equal flexibility whereby said first sleeve can be rotated relative to said second sleeve when restrained and the connecting member will rotate through half the angular travel which said first sleeve makes.

References Cited by the Examiner
UNITED STATES PATENTS 2,735,731 2/56 Freebairn _____ 308—2
2,907,563 10/59 Verde _____ 308—2 X FRANK SUSKO, *Primary Examiner.*